United States Patent
Bokor et al.

(10) Patent No.: US 9,230,237 B2
(45) Date of Patent: Jan. 5, 2016

(54) CONTRACT AMENDMENT MECHANISM IN A VIRTUAL WORLD

(75) Inventors: Brian R. Bokor, Raleigh, NC (US); Daniel E. House, Raleigh, NC (US); Andrew B. Smith, Morrisville, NC (US)

(73) Assignee: International Business Machines Corporation, Armonk, NY (US)

(*) Notice: Subject to any disclaimer, the term of this patent is extended or adjusted under 35 U.S.C. 154(b) by 2383 days.

(21) Appl. No.: 11/951,508

(22) Filed: Dec. 6, 2007

(65) Prior Publication Data
US 2009/0150804 A1    Jun. 11, 2009

(51) Int. Cl.
| G06F 3/00 | (2006.01) |
| G06F 3/048 | (2013.01) |
| G06Q 10/10 | (2012.01) |
| G06Q 50/18 | (2012.01) |
| G06Q 50/26 | (2012.01) |

(52) U.S. Cl.
CPC ............... *G06Q 10/10* (2013.01); *G06Q 50/18* (2013.01); *G06Q 50/26* (2013.01)

(58) Field of Classification Search
USPC ................................................ 715/757, 758
See application file for complete search history.

(56) References Cited

U.S. PATENT DOCUMENTS

| 6,570,563 | B1 * | 5/2003 | Honda ........................ 345/419 |
| 6,901,404 | B1 | 5/2005 | Bonutti |
| 7,143,358 | B1 * | 11/2006 | Yuen ............................. 715/757 |
| 7,666,095 | B2 | 2/2010 | Van Luchene |
| 2002/0042782 | A1 | 4/2002 | Albazz et al. |
| 2002/0129056 | A1 * | 9/2002 | Conant et al. .................. 707/511 |
| 2003/0014265 | A1 * | 1/2003 | Landry et al. ..................... 705/1 |
| 2004/0172321 | A1 * | 9/2004 | Vemula et al. .................... 705/8 |
| 2006/0075055 | A1 * | 4/2006 | Littlefield ..................... 709/206 |
| 2006/0178965 | A1 * | 8/2006 | Jung et al. ........................ 705/35 |
| 2007/0087819 | A1 * | 4/2007 | Van Luchene et al. ......... 463/25 |
| 2007/0117615 | A1 * | 5/2007 | Van Luchene .................. 463/25 |
| 2007/0260541 | A1 * | 11/2007 | Trickel ........................... 705/40 |
| 2008/0086379 | A1 * | 4/2008 | Dion et al. ...................... 705/14 |
| 2008/0097773 | A1 | 4/2008 | Hill et al. |
| 2008/0163089 | A1 * | 7/2008 | Altieri ........................... 715/764 |
| 2008/0307066 | A1 * | 12/2008 | Amidon et al. .............. 709/217 |
| 2009/0063168 | A1 * | 3/2009 | Finn et al. ......................... 705/1 |
| 2009/0089685 | A1 * | 4/2009 | Mordecai et al. ............. 715/757 |
| 2009/0119764 | A1 * | 5/2009 | Applewhite et al. ............. 726/9 |

(Continued)

OTHER PUBLICATIONS

Merriam-Webster, Incorporated; "Virtual," Merriam-Webster Online Dictionary, Retrieved from the Internet on Nov. 10, 2011, pp. 1-3, <http://www.merriam-webster.com/dictionary/virtual>.

(Continued)

*Primary Examiner* — Stephen Alvesteffer
(74) *Attorney, Agent, or Firm* — Charles L. Moore; Moore & Van Allen PLLC

(57) ABSTRACT

A method for amending a contract in a virtual world may include presenting an online chat option in response to another user's avatar coming within a predetermined proximity range of an avatar of the user and in response to the other user's avatar and the user's avatar having previously entered into a contract in the virtual world. The method may also include recording the online chat between the users to define an amendment to the contract in response to the online chat option being selected. The method may further include appending the amendment to contracting terms in a contract object in response to acceptance of the amendment by the users.

20 Claims, 2 Drawing Sheets

(56) References Cited

U.S. PATENT DOCUMENTS

2009/0150297 A1* 6/2009 Richard .......................... 705/80
2009/0170604 A1* 7/2009 Mueller et al. .................. 463/42

OTHER PUBLICATIONS

USPTO; Non-Final Office Action for U.S. Appl. No. 11/861,837 dated Jun. 7, 2010, pp. 1-22.
USPTO; Final Office Action for U.S. Appl. No. 11/861,837 dated Nov. 24, 2010, pp. 1-24.
USPTO; Non-Final Office Action for U.S. Appl. No. 11/861,837 dated Jul. 6, 2011, pp. 1-22.
USPTO; Final Office Action for U.S. Appl. No. 11/861,837 dated Nov. 18, 2011, pp. 1-26.
USPTO; Non-Final Office Action for U.S. Appl. No. 11/861,837 dated Oct. 4, 2013, pp. 1-23.
USPTO; Final Office Action for U.S. Appl. No. 11/861,837 dated Jun. 19, 2014, pp. 1-38.
USPTO; Non-Final Office Action for U.S. Appl. No. 11/861,837 dated Sep. 10, 2014, pp. 1-44.

* cited by examiner

CONTRACT AMENDMENT MECHANISM IN A VIRTUAL WORLD

BACKGROUND OF THE INVENTION

The present invention relates to simulations, virtual world simulations of the real-world or real-life or a virtual world and the like, and more particularly to a contract amendment mechanism for a contract in a virtual world.

Computer based simulations are becoming more ubiquitous. Simulations may be used for training purposes, for entertainment, for commerce or for other purposes. Computer simulations such as Second Life or similar simulations present a virtual world which allows users or players to be represented by characters known as avatars. Second Life is an Internet-based virtual world launched in 2003 by Linden Research, Inc. A downloadable client program called the Second Life Viewer enables users, called "Residents", to interact with others in the virtual world through motional avatars. The virtual world basically simulates the real world or environment. The users or residents via their avatar can explore the virtual world, meet other users or residents, socialize, participate in individual and group activities, create and trade items (virtual property) and services from one another. The challenge with respect to such simulations or virtual worlds is to make them as realistic or as much like the real-world or real-life as possible. This increases the utility of such simulations as a training tool or enjoyment of the participants or users as an entertainment medium. Second Life is a trademark of Linden Research, Inc. in the United States, other countries or both.

BRIEF SUMMARY OF THE INVENTION

In accordance with an embodiment of the present invention, a method for amending a contract in a virtual world may include presenting an online chat option in response to another user's avatar coming within a predetermined proximity range of an avatar of the user and in response to the other user's avatar and the user's avatar having previously entered into a contract in the virtual world. The method may also include recording the online chat between the users to define an amendment to the contract in response to the online chat option being selected. The method may further include appending the amendment to contracting terms in a contract object in response to acceptance of the amendment by the users.

In accordance with another embodiment of the present invention, a method for amending a contract in a virtual world may include providing an option for a contractor and a contractee to negotiate an amendment to a virtual world contract previously formed by the contractor and the contractee. The method may also include establishing an online communication link between the contractor and the contractee in response to selecting the option to negotiate the amendment to the virtual world contract. The online communications between the contractor and the contractee may be captured or recorded to form the amendment to the virtual world contract. The captured online communications between the contractor and the contractee may be appended to contract terms in a contract object to form the amendment to the virtual world contract.

Other aspects and features of the present invention, as defined solely by the claims, will become apparent to those ordinarily skilled in the art upon review of the following non-limited detailed description of the invention in conjunction with the accompanying figures.

DETAILED DESCRIPTION OF THE INVENTION

Figure 1:
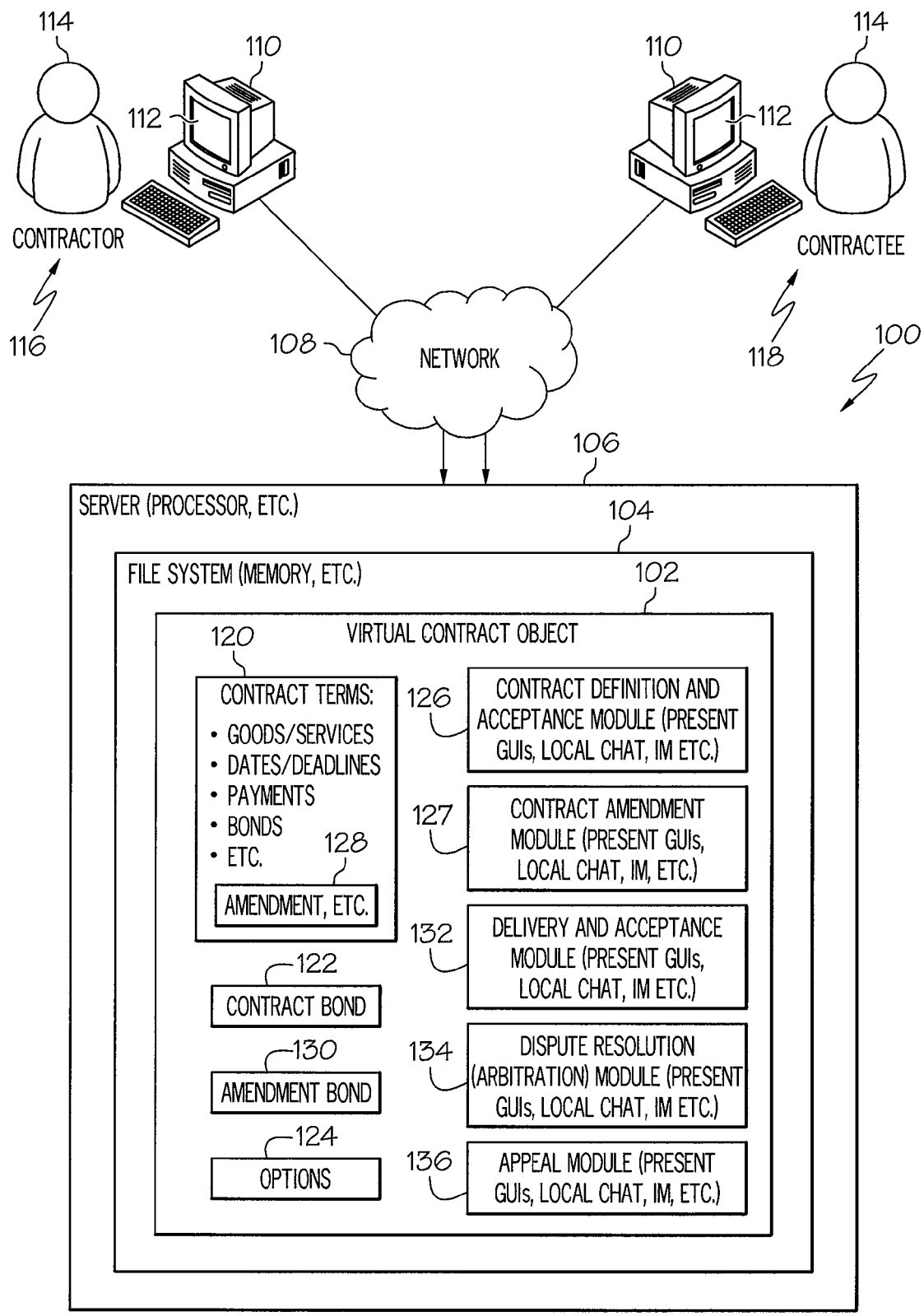
FIG. 1 is a block schematic diagram of an example of a system for amending a contract in a virtual world in accordance with an embodiment of the present invention.

The following detailed description of embodiments refers to the accompanying drawings, which illustrate specific embodiments of the invention. Other embodiments having different structures and operations do not depart from the scope of the present invention.

As will be appreciated by one of skill in the art, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a tangible medium such as a portable computer diskette, a hard disk, a random access memory (RAM), a read-only memory (ROM), an erasable programmable read-only memory (EPROM or Flash memory), an optical fiber, a portable compact disc read-only memory (CD-ROM), or other tangible optical or magnetic storage device; or transmission media such as those supporting the Internet or an intranet. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, radio frequency (RF) or other means.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages, or in functional programming languages, such as Haskell, Standard Meta Language (SML) or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

FIG. 1 is a block schematic diagram of an example of a system 100 for contract formation, contract dispute resolution, appealing a decision in a contract dispute and amending a contract in a virtual world in accordance with an embodiment of the present invention. The system 100 may include a virtual contract object 102. The virtual contract object 102 may present one or more predetermined graphical user interfaces to permit formation of a contract for virtual goods or services in a virtual world or simulation and to permit settlement of any disputes that may arise related to the contract. As described in more detail herein, the virtual contract object 102 may also present one or more predetermined graphical user interfaces to permit amendment of a contract in the virtual world. The virtual contract object 102 may be part of or a feature of a virtual world simulation system or program, such as Second Life or similar virtual world.

The virtual contact object 102 may also be a self contained system with embedded logic, decision making, state based operations and other functions that may operate in conjunction with a virtual world simulation, such as Second Life. The self contained system may allow businesses and individuals in the virtual world to operate across borders and legal systems. Virtual Worlds allow for legal or jurisdictional boundaries to be crossed much more easily. One embodiment of the present invention provides a system for working across legal or jurisdictional boundaries, cultural boundaries or the like, and dealing with any Government or legal issues that might be encountered in the real-world and can be created or simulated in the virtual world contract. For instance, someone in the United States building some virtual items, goods or objects for someone in China. An embodiment of the invention can provide a lightweight programmatic solution that can deal with formation of contacts and amendments to contracts dealing with any legal or Government entities, any legal boundary issues, international issues or similar issues.

The virtual contract object 102 may be stored on a file system 104 or memory of a server 106. The virtual contract object 102 may be accessed by users or participants via a network 108 using an Internet browser on a personal computer 110 or by similar means. The network 108 may be the Internet, a private network or other network. The predetermined GUIs that may be generated by the virtual contract object 102 as described herein and may be presented on a display 112 of the personal computer 110 to a user 114. As described herein, a user 114 who defines a contract for virtual goods or services may be defined as a contractor 116 and a user 114 that accepts the contract for the virtual goods and services may be defined as a contractee 118. The contractor 116 and contractee 118 are represented as avatars, residents or otherwise inhabitants of the virtual world.

The virtual contract object 102 may include contract terms 120. The contract terms 120 may be defined by the contractor 116. Examples of the contract terms may include an identification or description of the virtual goods or services to be offered; dates and deadlines, such as when the virtual goods or services will be offered, deadline for completion of the services, etc.; payments or costs for the goods or services; amount of a bond 122 that must be applied or stored in the virtual contract object 102 for payment by the contractee 118 upon fulfillment of the contract and acceptance by the contractee 118; and any other terms that may be pertinent to a particular virtual transaction or contract. In at least one embodiment of the present invention, the bond 122 may be referred to as a contractee bond paid by the contractee.

In another embodiment of the present invention, depending on the contract terms agreed to by the contractor 116 and contractee 118, the contractor 116 may also be required to apply a bond amount to be included in the virtual contract object 102. This optional contractor bond could be dispersed later in an arbitration process, or automatically returned to the contractor 116 upon successful completion of the virtual contact. Returning bond amounts, whether from contractor or contractee, upon successful completion of a contract is a functional feature of the virtual contract object 102.

The virtual contract object 102 may also include an options feature 124. The options feature 124 may include any future enhancements, configurations, and extensions to the existing system 100 or any additions relating to the virtual contract object 102. As an example a notification system could be added to the virtual contract object 102 which could be configured as an option to email updates or provide notification by some other mechanism.

The virtual contract object 102 may also include a contract definition and acceptance module 126. An example of a method that may be embodied in the contract definition and acceptance module 126 is described in U.S. patent application Ser. No. 11/861,837, filed Sep. 9, 2007, entitled "Contract Formation and Dispute Resolution in a Virtual World,"

assigned to the same assignee as the present invention and incorporated herein in its entirety by reference. The contract definition and acceptance module 126 may present one or more GUIs to the contractor 116 to permit the contractor 116 to define the contract terms 120. Internet communications technologies or applications, such as Local Chat, Instant Messaging (IM), e-mail, or similar communications means, may be used to permit defining the contract, negotiation of the contract between the contractor 116 and the contractee 118, and acceptance of the contract by the contractee 118.

The virtual contract object 102 may also include a contract amendment module 127. The contract amendment module 127 permits the contractee 118 and contractor 116 to negotiate amendments to the original contract. The amendments may include changes to clauses, additions or addendums to the contract and any other modifications or enhancements to the original contract in the virtual world. An online communications link may be established to negotiate and define or form the amendment to the virtual contract. Internet communications technologies or applications, such as Local Chat, IM, e-mail, or similar communications means, may be used to permit negotiation, defining or forming the amendment. The online communications, discussions or chat may be captured or recorded to form or define the amendment. The recorded online communications or amendment 128 may be appended to the contract terms 120 as illustrated in FIG. 1.

The contractor 116 and contractee 118 may also decide that a bond or amendment bond 130 is required for payment to the contractor 116 upon satisfaction or completion of the amendment 128 and acceptance of any deliverables associated with the amendment 128 by the contractee 118. An example of a method that may be embodied in the contract amendment module 127 will be described with reference to FIG. 2.

There need be only one "definitive," active or official copy or version of the contract or contract terms 120 and any amendments 128 thereto. The active or official copy may be maintained by a virtual world operator or entity that is providing or hosting the virtual world environment. There may be other copies, such as archival copies (historical records) or templates usable to create new contracts in the virtual world. Copies of older or previously formed virtual contracts may also be available to be used as guides to new contracts. However, the copy maintained by the virtual world operator may be the only definitive or active copy which is capable of being enforced and modified or amended. The contractor 116 and contractee 118 may each have a link to the active copy 120 and any amendments 128, but none of the parties to the contract actually "owns" the active contract or has the ability to modify or amend it unilaterally. The active or definitive contract is a shared object for the life of the transaction or until the contract is completed similar to that described in U.S. patent application Ser. No. 11/861,837 described above.

The virtual contract object 102 may also include a delivery and acceptance module 132. The delivery and acceptance module 132 may permit the contractor 116 to designate that the contract terms have been fulfilled. The delivery and acceptance module 132 may also permit the contractee 118 to review any virtual deliverables for fulfillment of the contract terms and to accept the contract as being fulfilled or completed. The delivery and acceptance module 132 may present one or more GUIs for the contractor 116 to designate that the contract terms have been fulfilled and to permit review and acceptance by the contractee 118. Internet communications means similar to those previously described may also be utilized by the delivery and acceptance module 132 to permit communications between the contractor 116 and the contractee 118. An example of a method that may be embodied in the delivery and acceptance module 132 is also described in U.S. patent application Ser. No. 11/861,837 which is incorporated herein by reference.

The virtual contract object 102 may further include a dispute resolution or arbitration module 134. The dispute resolution module 134 provides a mechanism for resolution of any contract disputes between the contractor 116 and contractee 118. For example, in response to the contractee 118 not accepting that the contract has been fulfilled or completed, the contract may be designated or flagged as being in dispute. An arbitrator or panel of arbitrators may review the contract dispute and select an appropriate resolution. The dispute resolution module 134 may present appropriate GUIs to the contractor 116, contractee 118 and arbitrator in addition to utilization of other known Internet communications technologies to facilitate the resolution of any dispute. An example of a method that may be embodied in the dispute resolution module 134 is also described in U.S. patent application Ser. No. 11/861,837 which is incorporated herein by reference.

In accordance with an embodiment of the present invention, the virtual contract object 102 may additionally include an appeal module 136. The appeal module 136 provides a mechanism for appealing a decision in a contract dispute in the virtual world. For example, if the contractor 116, the contractee 118, or both do not accept the decision resulting from the dispute resolution process associated with dispute resolution module 134, the contractor 116, contractee 118, or both may appeal the decision or ruling as described. An example of a method that may be embodied in the appeal module 136 is describe in U.S. patent application Ser. No. 11/876,845, filed Oct. 23, 2007 entitled "Appeal Mechanism for a Contract Dispute in a Virtual World," assigned to the same assignee as the present invention and incorporated herein in its entirety by reference.

Figure 2:
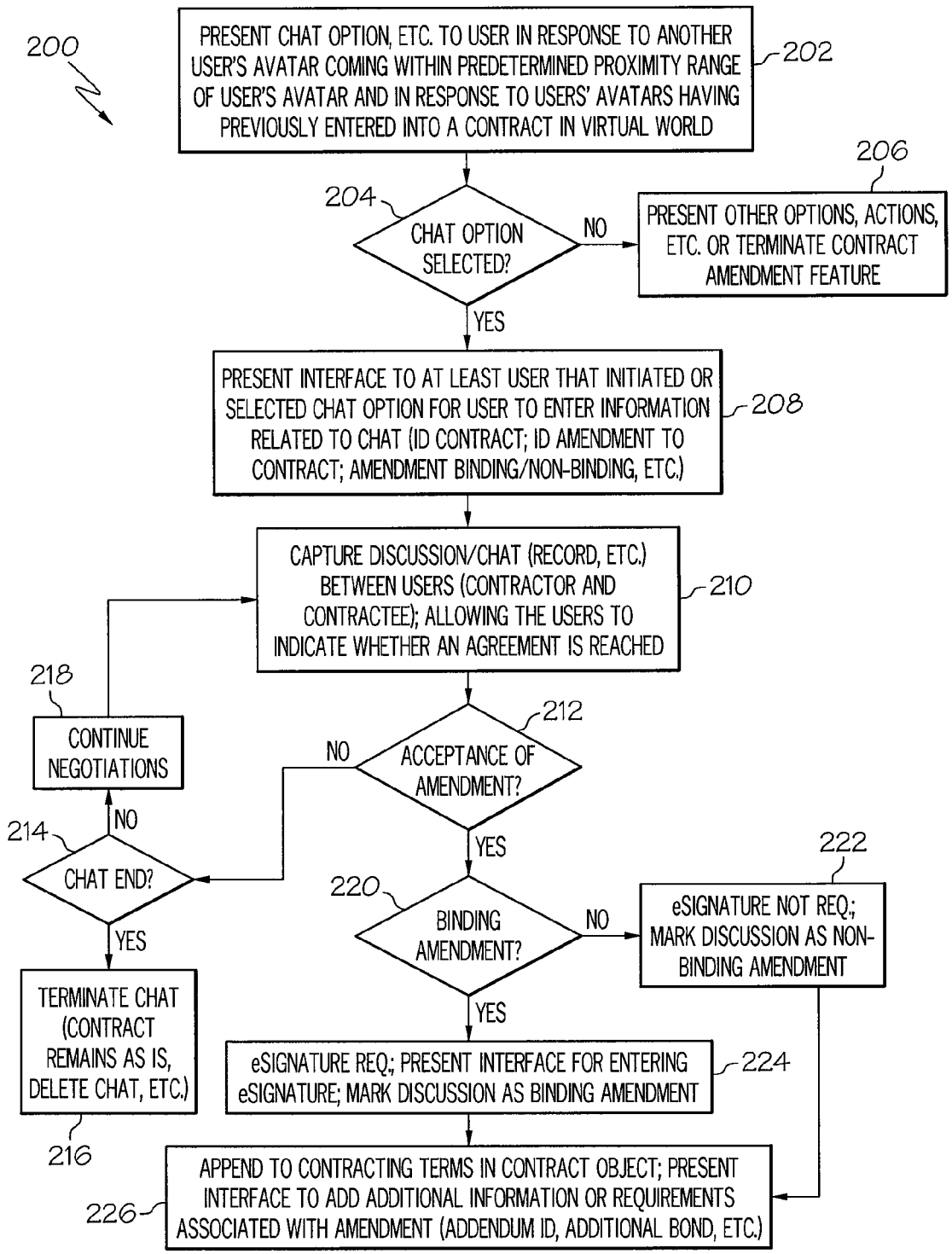
FIG. 2 is a flow chart of an example of a method for amending a contract in a virtual world in accordance with an embodiment of the present invention.

FIG. 2 is a flow chart of an example of a method 200 for amending a contract in a virtual world in accordance with an embodiment of the present invention. The method 200 may be embodied in the contract amendment module 127 of FIG. 1.

In block 202, an online chat option or discussion option may be presented to a user in response to another user's avatar coming within a predetermined proximity range of the user's avatar in the virtual world and in response to the user's avatar and the other user's avatar having previously entered into a contract in the virtual world. For example, a contractee, such as contractee 118 in FIG. 1 may be presented the chat option in response to the contractor's avatar coming within the predetermined proximity range of the contractee's avatar (or vise versa) in the virtual world. The chat or discussion option may use an Internet based communications technology similar to that previously described. The chat option may be presented in a graphical user interface, dialogue box or other mechanism presented on the user's computer screen, such as display 112 in FIG. 1.

In block 204, a determination may be made whether the user selected the chat option in block 202. If the user did not select the chat option, the method 200 may advance to block 206. In block 206, other options or actions may be presented to the user for selection or the contract amendment feature may be terminated.

If the chat option is selected by the user to whom presented in block 202, the method 200 may advance to block 208. In block 208, an interface may be presented to at least the user that initiated or selected the chat option for the user to enter information to be related to or associated with the chat. For example, the interface may include fields or boxes for entering an identification for the contract intended to be amended, an identification or description for the amendment to the contract, an indication whether the amendment is to be binding on the users or the users' avatars or non-binding, and any other information that may be appropriate or helpful in administering the contract and any amendment thereto.

In accordance with another embodiment of the present invention, information related to the online chat or amendment to the contract resulting from the chat, such as the information described in block 208, may be entered at some point in the process after the chat. In this embodiment, the method 200 may advance to block 210 from decision block 204 if the chat option is selected and the information related to the chat or amendment may be entered at a later point in the process.

In block 210, the online chat or discussion between the users or contractee and contractor may be captured to define the amendment to the contract. The chat may be captured by any means, such as recording or storing the chat, IM dialogue or other communications. In block 210, the users may be allowed to indicate whether an agreement related to the amendment has been reached. For example, a GUI, check box or similar arrangement may be presented for each user to indicate whether or not agreement or consensus has been reached as a part of the chat to define the amendment.

In block 212, a determination may be made whether or not an agreement has been reached by the users or contractee and contractor. If not, the method 200 may advance to block 214. In block 214, a determination may be made whether the chat has ended. The users may indicate that the chat has ended without an agreement as to the amendment by checking a box in a GUI or by other means. The system or method may also determine that the chat has ended without an agreement if the contractee's avatar and/or contractor's avatar move beyond the predetermined proximity range from one another in the virtual world without an indication that the amendment resulting form the chat is agreed to or accepted. The system or method may also determine that the chat has ended without an agreement if there is no communications between the contractor and contractee after a predetermined time period. A dialogue box or the like may be presented to the contractor and contractee asking if the chat has ended without an agreement after the predetermined time period expires with no communications between the parties.

If a determination is made in block 214 that the chat has ended without an agreement, the method 200 may advance to block 216. In block 216, the chat may be designated as being terminated without an agreement relative to the amendment and the contract may remain as originally formed. The recorded or captured chat may be deleted either automatically or at the option of the users.

If a determination is made in block 214 that the chat has not ended and an agreement has not been reached, the negotiations may continue in block 218 and the chat or discussion may continue to be captured in block 210.

If a determination is made in block 212 that an agreement as to the amendment resulting from the chat or defined by the chat has been reached, the method 200 may proceed to block 220. In block 220, a determination may be made whether the amendment is to be a binding amendment on the contractor and contractee. Whether the amendment is to be binding or non-binding may be selected by the contractor and contractee at this stage in the process or in another embodiment, as described with respect to block 208, whether the amendment is to be binding may be previously selected. A binding amendment may be defined as a substantive change or change in the scope of the original contract. For example, the contractee decides he does not like the structure of a virtual building being built by the contractor and wants to change the size, layout, roofing or other feature of the building. A binding amendment typically will require a signature or electronic signature.

A non-binding amendment may be defined as a minor or non-substantive change to the contract. For example, a change in color may be a non-binding amendment. A non-binding amendment may typically be carried out whether the amendment was signed or there was a refusal to sign by one of the parties. A signature would prompt or correspond to a binding/legal addition to the contract whereas no signature would correspond to non-binding comments or notes added to the contract terms.

If the amendment is non-binding in block 220, an electronic signature or esignature may not be required and in block 222 the discussion or online chat defining the amendment may be marked or otherwise designated as being a non-binding amendment. Designation as a non-binding amendment may prevent the parties from being able to access the dispute resolution module 134 and appeal module 136 with respect to any aspects of the amendment.

If the amendment is binding in block 220, an esignature may be required in block 224 and the chat defining the amendment may be marked or otherwise designated as being a binding amendment. An interface may be presented to each user for entering an esignature in block 224.

If the amendment is binding, other requirements relative to the amendment and contract may come into play. For example, an option may be presented for requiring an additional bond to be submitted by the contractee, such as amendment bond 130 in FIG. 1. This may be the case if the amendment includes substantive changes or the scope of the contract is changed significantly by the amendment. In another embodiment of the present invention, the contractor may also be required to post an amendment bond in the event the terms associated with the binding amendment are not satisfied and the dispute resolution feature is needed.

In block 226, the captured online chat defining the amendment may be appended to the contract terms in the contract object. In accordance with an embodiment of the present invention, in block 226, an interface or GUI may also be presented to the contractee and/or contractor to add any additional information relative to the amendment. As illustrated in FIG. 1, the amendment 128, or chat defining the amendment, and any associated information, such as the information entered in block 226 (or information entered in block 208 in accordance with another embodiment of the present invention) may be appended to the contract terms 120 in the virtual contract object 102. The additional bond or amendment bond 130 may also be stored in the virtual contract object 102 as illustrated in FIG. 1.

In accordance with one embodiment of the present invention, an amendment defined by the chat may automatically be added to the virtual contract object 102. A check box may be presented to a user to indicate that the online chat or discussion is part of or related to a previously formed virtual contract. The chat defining the amendment may automatically be posted to the contract terms 120 associated with the contract in response to the check box being checked by the user using a computer pointing device or the like. A GUI requiring an esignature from each user or contractee 118 and contractor 116 may also be presented automatically without any intervention by either of the users in response to the box being checked that chat or discussion is part of a contract or amendment to a contract.

The flowcharts and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems which perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Although specific embodiments have been illustrated and described herein, those of ordinary skill in the art appreciate that any arrangement which is calculated to achieve the same purpose may be substituted for the specific embodiments shown and that the invention has other applications in other environments. This application is intended to cover any adaptations or variations of the present invention. The following claims are in no way intended to limit the scope of the invention to the specific embodiments described herein.

What is claimed is:

1. A method for amending a contract in a virtual world, comprising:
   presenting an online chat option in response to another user's avatar coming within a predetermined proximity range of an avatar of the user and in response to the other user's avatar and the user's avatar having previously entered into a contract in the virtual world;
   recording the online chat between the users to define an amendment to the contract in response to the online chat option being selected; and
   appending the amendment to contracting terms in a virtual contract object in response to acceptance of the amendment by the users.

2. The method of claim 1, further comprising presenting an interface to at least the user that selected the online chat option for the user to enter information related to the online chat.

3. The method of claim 1, further comprising:
   allowing identification of the contract; and
   allowing identification of the amendment to the contract.

4. The method of claim 1, further comprising allowing the online chat to be defined as one of a binding amendment and a non-binding amendment.

5. The method of claim 4, further comprising requiring an electronic signature from each of the users in response to the online chat being designated as defining a binding amendment.

6. The method of claim 4, further comprising presenting an interface to each user to enter an electronic signature in response to the chat being designated as defining a binding amendment.

7. The method of claim 1, wherein appending the amendment to the contract terms comprises appending the recorded online chat to the contract terms in the contract object.

8. The method of claim 1, further comprising presenting an interface to enter at least one of additional information and requirements to be associated with the amendment in response to the amendment being appended to the contract terms in the contract object.

9. The method of claim 8, wherein presenting the interface to enter at least one of additional information and requirements comprises presenting a field to enter a requirement for an additional bond to be paid by a contractee in association with the amendment.

10. The method of claim 1, further comprising:
    discontinuing to record the online chat in response to one of determining that the users have accepted the amendment and determining that the users have terminated the chat; and
    deleting the recording of the online chat in response to the users terminating the chat without accepting the amendment.

11. A method for amending a contract in a virtual world, comprising:
    providing an option for a contractor and a contractee to negotiate an amendment to a virtual world contract previously formed by the contractor and the contractee;
    establishing an online communication link between the contractor and the contractee in response to selecting the option to negotiate the amendment to the virtual world contract and in response to the contractor and contractee coming within a predetermined proximity range of one another within the virtual world;
    capturing online communications between the contractor and the contractee to form the amendment to the virtual world contract; and
    appending the captured online communications between the contractor and the contractee to contract terms in a contract object to form the amendment to the virtual world contract.

12. The method of claim 11, wherein providing the option for the contractee and the contractor to negotiate an amendment to the virtual world contract comprises presenting an interface to at least the contractee to select an online chat option in response to a contractor's avatar and a contractee's avatar coming within a predetermined proximity range of one another in the virtual world.

13. The method of claim 11, further comprising providing an option to designate the amendment as being one of a binding amendment and a non-binding amendment.

14. The method of claim 13, further comprising requiring an electronic signature from each user in response to the amendment being a binding amendment.

15. The method of claim 11, further comprising presenting an interface to enter selected information related to the virtual world contract and the amendment to the contract.

16. The method of claim 15, wherein presenting the interface comprises:
    presenting a field for entering an identification of the contract; and
    presenting a field for entering an identification of the amendment to the contract.

17. The method of claim 11, further comprising providing a mechanism for requiring and obtaining an amendment bond from the contractee before the contractor starts any work associated with the amendment.

18. A method for amending a contract in a virtual world, comprising:
- providing an option for a contractor and a contractee to negotiate an amendment to a virtual world contract previously formed by the contractor and the contractee;
- establishing an online chat between the contractor and the contractee in response to selecting the option to negotiate the amendment to the virtual world contract and in response to a contractor's avatar and a contractee's avatar coming within a predetermined proximity range of one another in the virtual world;
- recording the online chat between the contractor and the contractee to form the amendment to the virtual world contract; and
- appending the recorded online chat between the contractor and the contractee to contract terms in a contract object to form the amendment to the virtual world contract.

19. The method of claim 18, further comprising allowing the online chat to be defined as one of a binding amendment and a non-binding amendment.

20. The method of claim 18, further comprising presenting an option for a bond to be associated with the amendment.

* * * * *